Aug. 1, 1950   I. E. VEITCH   2,517,261
MOLDED PRODUCT
Filed Oct. 8, 1949
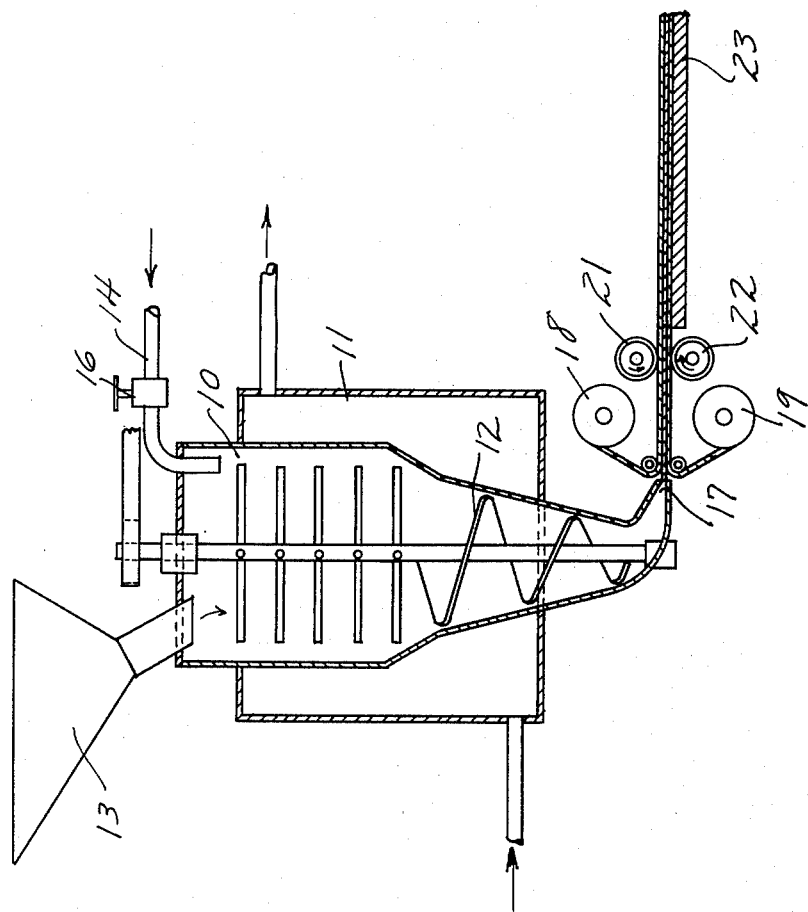
INVENTOR.
ISAAC E. VEITCH
BY
ATTORNEY Patented Aug. 1, 1950

2,517,261

UNITED STATES PATENT OFFICE 2,517,261

MOLDED PRODUCT

Isaac E. Veitch, Birmingham, Ala.

Application October 8, 1949, Serial No. 120,416

7 Claims. (Cl. 260—29.4)

This application is a continuation in part of my application Serial No. 572,099, filed January 9, 1945, now abandoned.

This invention relates to a process of making molded products employing as the binding agent an alkali metal silicate, having incorporated therein an improved water and moisture resisting agent and a suitable granulated filling material, such for example as granulated blast furnace slag, limestone, or the waste material from saw mills and paper mills, such as ground bark or sawdust, the object being to utilize inexpensive or otherwise waste products as the filling material.

The principal object of my invention is to provide an improved molded product and a process of making the same, utilizing a granular filling material and a binding agent comprising an alkali metal silicate as the principal ingredient, together with a relatively minor proportion of a urea-formaldehyde condensation product, which latter acts to cover the silicate particles with a protective film, whereby the silicate is protected from the slow absorption of carbon dioxide from the binding material and from the air, which would cause granulation and deterioration of the silicate.

As is well known in the art to which my invention relates, although the initial strength of molded products such as composition board, building blocks and the like, in which an alkali metal silicate is employed as the binding material is ample, there is enough water normally present in the air and in the product itself to permit the slow absorption of carbon dioxide by the silicate and a gradual granulation of the colloidal film formed by the silicate. ("Soluble Silicates in Industry"; James G. Vail; The Chemical Catalogue Company, Inc. 1928, page 222.) I have discovered that this tendency toward granulation can be effectively prevented by dissolving a small quantity of urea-formaldehyde condensation product in a state of arrested or intermediate reaction, in the silicate solution before it is mixed with the binding material employed. Test panels which I have made using the said condensation product in the silicate have stood for more than four years, subject to weathering conditions, without any indication of granulation, whereas similar panels made at the same time and subject to the same conditions, using sodium silicate alone, have begun to show signs of granulation in a very few months.

The condensation product which I preferably employ is a cold-setting urea-formaldehyde condensation product such as is described by Ellis in his work on the Chemistry of Synthetic Resins, page 645. It may be formed by fusing a mixture of para-formaldehyde and urea, with a slight excess of paraformaldehyde over equimolecular proportions, and stopping the reaction at an early stage to prevent the formation of insoluble polymers. The product thus formed is a water soluble glue. When dissolved in water and used as a glue, it appears to react further and sets, becoming moisture resistant and much less water soluble. While not essential, I have found that the setting is hastened by moderate heating. A glue of substantially the composition just described is manufactured and sold in powdered form under the trade name "Cascamite" and contains one per cent or less of a suitable catalyst such as aluminum chloride.

When from 0.3 to 4.0 per cent by weight of the glue of the character described is added to a sodium silicate solution, constituting the balance of the binding agent, it liquefies and forms a substantially homogeneous solution with the sodium silicate. When the solution thus formed is incorporated in suitable filling material and the mixture is molded, upon drying and setting, the glue forms a protective water resistant stable colloidal film around the silicate particles which seals them against the slow absorption of carbon dioxide mentioned by Vail. In forming my improved molded product, as hereafter described, I have found that, by heating the mixture to a temperature of from 90 degrees to 150 degrees C. the binding agent is better incorporated in the filling material and the setting thereof is hastened. It may also be that the sodium silicate comprising the principal ingredient in the binding agent acts as a catalyst to hasten the reaction. I have found it very important that the glue be in a dry state when dissolved in the silicate solution rather than to be first dissolved in water and the dissolved glue added to the silicate solution. In the latter case, the glue soon goes to a jelly-like consistency and appears immiscible with the silicate solution rather than forming a mutual solution therewith.

An ideal filling material for use with my improved binder is granulated or comminuted blast furnace slag. Such material, as is well known, has a cementing action of its own, and in combination with an alkali metal silicate, forms products which appear to be stronger than those formed with other fillers. Furthermore, where the slag, silicate, and urea-formaldehyde condensation products are mixed together and allowed to set, the product formed is highly water and moisture resistant.

Where lightness of weight, cheapness, and heat insulating properties are sought, sawdust is advantageous. Any suitable filler may be used, however, the principal object of my invention being the provision of a molded product having the requisite strength, inexpensiveness and permanency.

The preferred proportions which may be employed in carrying out my invention are as follows:

First, add from one to six ounces by weight (approximately 0.3 to 4 per cent of the total binding agent) glue to each gallon of sodium silicate solution of approximately 1.28 sp. g. and stir until thoroughly dissolved. Then for each one hundred pounds of ground or granulated blast furnace slag, weighing approximately 50 pounds per cubic foot, add from four pints to nine pints of the water glass-glue solution and mix thoroughly. The liquid binding agent flows into the interstices between the particles of granulated slag so that the volume of moldable mixture remains at approximately two cubic feet. The ingredients are preferably heated, in order to obtain a thorough mixture and ultimate coating of the colloidal silicate film.

In the single figure of the accompanying drawing I show diagrammatically the manufacture of wall board employing my improved binding material.

Referring to the drawing, I show a mixer 10 provided with a heating jacket 11 and having an extrusion screw 12 at the lower end thereof. Filling material, such as blast furnace granulated slag, sawdust or other suitable material, is fed into the mixer from a hopper 13 while my improved binding material is run into the mixer through a pipe 14, having a regulating valve 16 therein. In its passage through the mixer, the material is preferably heated sufficiently to render the sodium silicate solution less viscous and thus provide better impregnation of the filling material.

The mixture is forced out through an opening 17 at the lower end in the form of a sheet. Protective coverings may be applied to the material as it is extruded, from rollers 18 and 19 disposed on the upper and lower sides of the sheet. The sheet then passes between pressing rollers 21 and 22, onto a delivery table 23 where it may be prepared for final use, as is well understood. Protective coverings for the board may be made of paper, felt, plastic, veneering or any other suitable material.

Where sawdust or other waste wood products are employed as the filling material, a volume of filler equivalent to that of the one hundred pounds of granulated slag hereinbefore described, weighs considerably less. For example, where pine sawdust is utilized as the filling material, the following proportions may be employed to provide two cubic feet of moldable mixture:

Sawdust 37½ pounds (about two cubic feet)
Water glass—glue solution 4 to 9 pints It will be observed that in each instance I may employ from 2 to 4.5 pints, or from 3.37 per cent to 7.75 per cent by volume of the water glass-glue solution for each cubic foot of filling material, before molding. I have found that 4 pints or ½ gallon of binding agent per cubic foot of granulated filler provides a wall board of maximum strength and hardness. The amount may be varied from 1 quart per cubic foot to 4.5 pints per cubic foot, depending upon the desired strength and hardness.

I have found that wall board constructed in accordance with the foregoing examples has a strength much greater than that employing Portland cement or gypsum cement as the binding material. Where slag is employed as the filling material, if it be somewhat granular in texture, nails may be driven through the boards without breaking them and where sawdust or other ground wood products are employed as a filler the board may be sawed, cut with edged tools, and nailed in the same manner that wood boards may be handled. It will therefore be apparent that I have devised an improved molded product employing sodium silicate as the principal binding agent in which the products have the requisite strength and permanency.

While I have described only one method of carrying out my invention, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a molded wall board, a binding agent comprising an alkali metal silicate as its principal ingredient with from 0.3 to 4.0 per cent by weight of said binding agent consisting of a water soluble cold setting formaldehyde-urea condensation product incorporated therein.

2. In a molded wall board, a binding agent comprising principally an alkali metal silicate in which the particles thereof have a protective colloidal coating of a formaldehyde-urea condensation product.

3. A molded product comprising a granular filling material and a binding agent consisting principally of an alkali metal silicate and having from 0.3 to 4.0 per cent by weight of said binding agent consisting of a formaldehyde-urea condensation product, said binding agent consisting in from 3.37% to 7.75% of the volume of the granular filling material.

4. In a molded wall board, a filler of granulated blast furnace slag, and a binder consisting principally of sodium silicate with from 0.3 to 4.0 per cent by weight of said binder consisting of a cold setting formaldehyde-urea condensation product incorporated therein.

5. In a molded wall board, a filler of granulated blast furnace slag, and a binder consisting principally of sodium silicate in which the particles thereof have a coating of a formaldehyde-urea condensation product.

6. A binding agent for molding wall board and the like comprising as its principal ingredient water solution of an alkali metal silicate having from 0.3 to 4.0 per cent by weight of the binding agent consisting of a cold setting formaldehyde-urea condensation product incorporated therein.

7. A binding material for molded articles comprising as its principal ingredient a water solution of sodium silicate having a specific gravity of approximately 1.28, and having incorporated therein a cold setting formaldehyde-urea glue forming from 0.3 to 4 per cent by weight of the sodium silicate solution.

ISAAC E. VEITCH.

REFERENCES CITED

The following references are of record in the file of this patent:

UNITED STATES PATENTS

| Number | Name | Date |
| --- | --- | --- |
| 2,385,438 | Fowler et al. | Sept. 25, 1945 |